United States Patent
Richter et al.

(10) Patent No.: US 11,547,959 B2
(45) Date of Patent: Jan. 10, 2023

(54) MAGNETIC BAFFLE INSERT FOR USE WITH A BASKET STRAINER

(71) Applicant: The Metraflex Company, Chicago, IL (US)

(72) Inventors: James R. Richter, Chicago, IL (US); Martin I. Rogin, Libertyville, IL (US); Kathleen Elizabeth Bollito, Chicago, IL (US); Ganesh Appasaheb Patil, Chicago, IL (US)

(73) Assignee: The Metraflex Company, Chicago, IL (US)

( * ) Notice: Subject to any disclaimer, the term of this patent is extended or adjusted under 35 U.S.C. 154(b) by 0 days.

(21) Appl. No.: 17/021,186

(22) Filed: Sep. 15, 2020

(65) Prior Publication Data
US 2022/0016551 A1   Jan. 20, 2022

Related U.S. Application Data

(63) Continuation-in-part of application No. 16/932,325, filed on Jul. 17, 2020, now Pat. No. 11,253,870.

(51) Int. Cl.
| | | |
|---|---|---|
| *B01D 29/31* | (2006.01) |
| *B01D 35/153* | (2006.01) |
| *B01D 35/16* | (2006.01) |
| *B01D 36/00* | (2006.01) |
| *B03C 1/033* | (2006.01) |
| *B03C 1/28* | (2006.01) |
| *B03C 1/30* | (2006.01) |
| *B01D 29/11* | (2006.01) |
| *B03C 1/035* | (2006.01) |
| *B01D 35/06* | (2006.01) |

(52) U.S. Cl.
CPC .......... *B01D 29/118* (2013.01); *B01D 35/06* (2013.01); *B03C 1/035* (2013.01)

(58) Field of Classification Search
CPC ....... B01D 29/118; B03C 1/035; B03C 1/284; B03C 2201/28
USPC .............................. 209/223.1; 210/305, 454
See application file for complete search history.

(56) References Cited

U.S. PATENT DOCUMENTS 2,149,764 A * 3/1939 Frei ...................... B03C 1/0332
                                                         209/215
2,459,534 A   1/1949 Kennedy
(Continued)

FOREIGN PATENT DOCUMENTS

| EP | 3608007 A1 | 2/2020 |
| WO | WO-9958247 A1 * | 11/1999 | ............. B01D 35/06 |

OTHER PUBLICATIONS

Notification of Transmittal of International Search Report and Written Opinion from corresponding PCT application No. PCT/US21/46816 dated Dec. 1, 2021.

*Primary Examiner* — Michael McCullough
*Assistant Examiner* — Molly K Devine
(74) *Attorney, Agent, or Firm* — Greer, Burns & Crain, Ltd.

(57) ABSTRACT

A basket strainer insert having a body with one or more magnets disposed therein. The basket strainer insert includes a baffle to disrupt the flow of liquid through the basket strainer and facilitates the attraction of metallic particles to the body. The baffle has a plurality of lobes secured to the body with connection portions and separated from each other by gaps. The lobes may have an inward bend, an outward bend, or may be planar.

20 Claims, 7 Drawing Sheets

(56) References Cited

U.S. PATENT DOCUMENTS

| | | |
|---|---|---|
| 2,800,230 A | 7/1957 | Thoma |
| 3,817,380 A | 6/1974 | Brown |
| 3,887,469 A | 6/1975 | Hayashi |
| 4,495,068 A | 1/1985 | Rosaen |
| 4,783,266 A | 11/1988 | Titch et al. |
| 5,851,386 A | 12/1998 | Paul |
| 6,902,066 B2 | 6/2005 | Yang |
| 8,636,907 B1 | 1/2014 | Lin et al. |
| 9,669,414 B2 * | 6/2017 | McAllorum .......... B03C 1/0332 |
| 10,029,264 B2 | 7/2018 | Adey et al. |
| 10,058,875 B2 | 8/2018 | Van Schie et al. |
| 2003/0116494 A1 * | 6/2003 | Elsegood ................ B03C 1/286 |
| | | 210/222 |
| 2006/0102534 A1 | 5/2006 | Faria |
| 2007/0256672 A1 | 11/2007 | Wang |
| 2010/0155336 A1 | 6/2010 | Simonson |
| 2010/0294706 A1 | 11/2010 | Simonson |
| 2017/0074524 A1 | 3/2017 | Adey et al. |
| 2017/0312757 A1 | 11/2017 | Fleenor et al. |
| 2019/0314744 A1 | 10/2019 | Richter et al. |
| 2020/0222832 A1 | 7/2020 | Holbach et al. |

\* cited by examiner

MAGNETIC BAFFLE INSERT FOR USE WITH A BASKET STRAINER

RELATED APPLICATIONS

This application is a continuation-in-part of U.S. application Ser. No. 16/932,325 filed on Jul. 17, 2020, the entirety of which is hereby incorporated by reference.

FIELD OF THE INVENTION

The present invention relates to a magnetic baffle insert for a basket strainer, and more particularly to a baffled structure that contains a magnet for removing metal particles within a fluid passing through the basket strainer.

BACKGROUND OF THE INVENTION

Basket strainers are used for protecting pumps, compressors, turbines, meters, automatic valves, sprinkler heads, nozzles, steam traps, heat exchangers, meters, and other pipeline equipment. The strainer mechanically removes solids from a flowing fluid with a perforated, mesh, or wedge wire straining element. The solids are retained in the straining element, allowing the fluids to flow therethrough and be passed to downstream equipment. After a certain period of time, the basket strainer, which may be one of a plurality of basket strainers arranged in parallel, is taken offline to remove the retained debris in order to avoid excess pressure drop associated with the collection of solids in the straining element.

Pumps with motors that utilize magnets are very efficient and thus desirable in many applications. However, while the pumps may be efficient, the magnets in the pump attract fine metal particles, such as iron oxides, that are in the fluid. The fine metal particles stick to the pump elements, such as the impellers, negatively impacting the pump's performance. These fine particles have always been present in the fluid but have not impacted the performance of non-magnetic pumps.

The pores of conventionally used straining elements are typically too large to efficiently remove these fine metal particles from the fluid. Accordingly, some basket strainers utilize magnets to attract the metal particles. While presumably effective for their intended purposes, when utilized in traditional basket strainers, the magnets are not easily removed without modifying the existing basket strainer equipment. Additionally, some configurations do not allow for the magnets to be removed and magnetic debris to be removed from the magnetic surfaces in a quick and efficient manner. Furthermore, the fluid is often flowing too quickly for the magnet to attract and retain the metal particles.

Therefore, it would be desirable to provide a basket strainer that allows for magnetic particles to be more effectively and efficiently collected and removed. It would also be desirable if such a basket strainer provided such a feature without requiring the strainer to be taken offline for an extended period of time.

SUMMARY OF THE INVENTION

A basket strainer insert has been invented which includes one or more magnets that are configured to be housed in a body without contacting the process fluid. A drywell is used to house the magnets. A baffle extends outwardly from the body and is secured in place by a collar. The baffle is selectively removable from the body, which allows magnetic material to be wiped away before the basket strainer insert is put back into the straining element and the basket strainer is returned to service. Thus, the present basket strainer provides for magnetic particles in the fluid to be collected and removed in an effective and effective manner. Baffles having lobes are used to reduce the flow rate of the fluid so that small mass iron containing particles in the fluid may be attracted and captured by the magnetic field.

Accordingly, in an aspect of the present invention, the present invention may be generally characterized as providing a basket strainer insert having: a body with a first end, a second end, and an intermediate portion; at least one magnet disposed in the body and configured to remove particles from a fluid, the first end of the body configured to selectively open to allow for removal of the at least one magnet from the body; and a baffle secured to the body. The baffle has between three to six lobes, with adjacent lobes separated by gaps. Each lobe may be secured to the body by a connecting portion. The connecting portions may be integrally formed with the lobes. The connecting portions may be integrally formed with the body. The lobes may have an inward bend, an outward bend, or they may be planar. The connecting portions extend between the body and the lobes and form a T-shape. The lobes may be equidistantly spaced from each other.

In another aspect, the present invention may be characterized, broadly, as providing a basket strainer insert which has: a body with a first end, a second end, and an intermediate portion; at least one magnet disposed in the body and configured to remove particles from a fluid, the first end of the body configured to selectively open to allow for removal of the at least one magnet from the body; and a baffle secured to the body. The baffle includes four lobes, with adjacent lobes separated by gaps. Each lobe is secured to the body by a connecting portion integrally formed with the lobe. The lobes may have an inward bend, an outward bend, or they may be planar. The connecting portions extend between the body and the lobes and form a T-shape. The lobes may be equidistantly spaced from each other.

In still another aspect, the present invention may be characterized, broadly, as providing a basket strainer insert which has: a body having a first end, a second end, and an intermediate portion; at least one magnet disposed in the body and configured to remove particles from a fluid, the first end of the body configured to selectively open to allow for removal of the at least one magnet from the body; and a baffle secured to the body. The baffle has four lobes, with adjacent lobes separated by gaps. Each lobe is secured to the body by a connecting portion integrally formed with the lobe and the connecting portions are integrally formed with the body. The four lobes each have an inward bend. The connecting portions extend between the body and the lobes and form a T-shape. The lobes may be equidistantly spaced from each other.

These and other aspects and embodiments of the present invention will be appreciated by those of ordinary skill in the art based upon the following description of the drawings and detailed description of the preferred embodiments.

BRIEF DESCRIPTION OF THE DRAWING

The attached drawings will make it possible to understand how the invention can be produced and practiced, in which.

DETAILED DESCRIPTION OF THE PREFERRED EMBODIMENTS

As mentioned above, a new basket strainer insert has been invented which includes a magnet and a baffle which may be removably mounted to a body containing the magnet.

Accordingly, with reference the attached drawings, one or more embodiments of the present invention will now be described with the understanding that the described embodiments are merely preferred and are not intended to be limiting.

Figure 1:
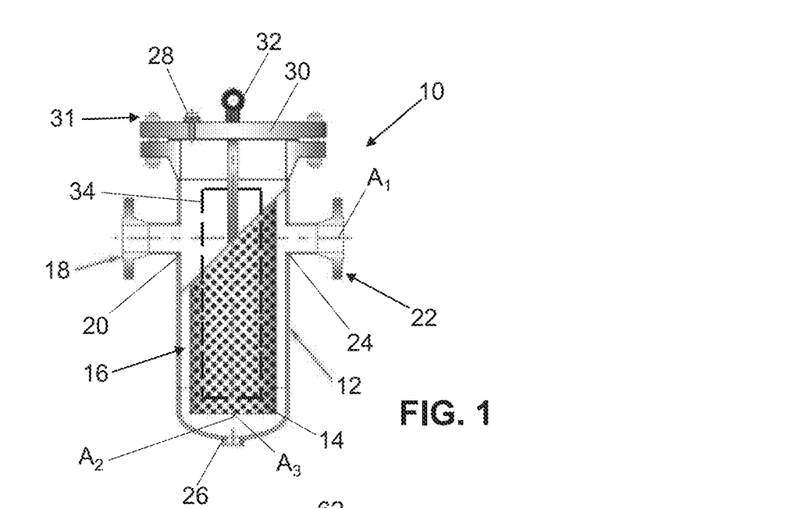
FIG. 1 is a partial cutaway, side view of a basket strainer that may be used in accordance with one or more embodiments of the present invention.

With reference to FIG. 1, a basket strainer 10 typically comprises a housing 12. The housing 12 can be made from a variety of appropriate materials, including, for example, iron, carbon steel, carbon moly, stainless steel, chrome moly, aluminum, bronze, monel, nickel, HASTELLOY® B, HASTELLOY® C, titanium, and plastic.

The basket strainer 10 also includes a straining element 14. Inside of the housing 12 is a cavity 16 which houses the straining element 14. The housing 12 includes an inlet 18 to the cavity 16, configured to receive a fluid, disposed at a first end 20 of the housing 12. An outlet 22 from the cavity 16, configured to provide a cleaned fluid, is disposed at a second end 24 of the housing 12. The inlet 18 and outlet 22 of the housing 12 are both generally circular and have an axis $A_1$ extending through the centers of the inlet 18 and the outlet 22.

The housing 12 also includes a drain 26 that is disposed in a portion of the cavity 16 that houses the straining element 14. The drain 26 is positioned at a lower end of the cavity 16 so that retained liquid will collect at the drain 26 under the influence of gravity. A ball valve (not shown) may be disposed in the drain 26. The ball valve allows for liquid and any debris to drain from the housing 12 when the strainer is taken offline.

The basket strainer 10 has a lid 30 that is affixed to the housing 12 using a plurality of bolts 31. However, other hardware could be used to secure the lid 30 to the housing 12 including eye bolt clamps, sanitary clamps, or assorted types of flanges known in the art. An optional vent 28 may be provided in the lid 30, having a further ball valve (not shown).

A longitudinal axis $A_2$ of the housing 12 is coincident with the longitudinal axis $A_3$ of the straining element 14 and extends from a center of the lid 30 to a center of the bottom portion of the housing 12. A lifting eye 32 may be disposed in the center of the lid 30.

In the depicted embodiment, the removable cover plate or lid 30 has the lifting eye 32, but a handle or a davit for lifting and moving the lid out of the way to access the straining element 14, which is a strainer basket, may be utilized.

Various materials can be used for the straining element 14 including carbon steel, stainless steel, monel, HASTELLOY® B, HASTELLOY® C, Alloy 20, nickel, brass, copper, galvanized steel, INCOLOY®, INCONEL®, titanium, aluminum, and plastic, to name a few. The straining element 14 can also be lined with various coatings to minimize corrosion, such as epoxy, asphalt, polytetrafluoroethylene, vinyl, polychlorotrifluoroethene, rubber, neoprene, baked phenolic, and plating with zinc, cadmium, nickel, galvanizing, etc.

One consideration in the selection of a straining element 14 material is the size of the perforations, mesh or wedge wire opening used in the making of the straining element 14 based upon the size and quantity of particles which can pass through downstream equipment without causing damage to the equipment. The use of smaller holes than those actually required, can lead to too-frequent cleaning, excessive pressure drops, and screens constructed of thinner metal which will withstand less pressure differential. Generally, stainless steel perforated metal may be typically obtained in a thickness which is one gage thickness less than the diameter of the punched holes. Carbon steel and brass can be obtained in approximately the same thickness as the hole diameter. A common way to accomplish fine straining in large straining elements 14 is by mesh lining a larger hole, heavier gage perforated plate.

As fluids with debris are passed through the straining element 14, the debris is collected and accumulated in the straining element 14. The cleaned fluid, having a lower amount of debris, will pass out of the straining element 14. After passing out of the straining element 14, cleaned fluid exits the body 12 via the outlet 22.

However, as indicated above, due to the use of pumps that include magnetic motors, it is desirable to remove metal particles that are too fine to be efficiently retained by the pores in the straining element 14 from the fluid passing through and out of the basket strainer 10.

There is a cavity 34 within the housing between the interior of the straining element 14 and the lid 30 that accommodates the basket strainer insert 40.

Turning to FIGS. 2-6, an embodiment of the present invention is shown which includes the basket strainer insert 40 having a substantially cylindrical shape to fit the basket strainer cavity 34 of FIG. 1. Disposed inside of the basket strainer insert 40 is a body 42 having one or more magnets 80 (shown in FIG. 7), and preferably, a plurality of magnets therein. The magnets 80 may be cylindrically shaped. While some conventional strainers provide magnets 80 for removing the fine metal particles, these conventional basket strainers do not provide for the ability to easily and efficiently remove the retained metal particles from the cavity 16. In contrast, in the present basket strainer insert 40, the one or more magnets are configured to be removed from the housing 12 and cleaned to remove magnetic debris as needed.

Figure 2:
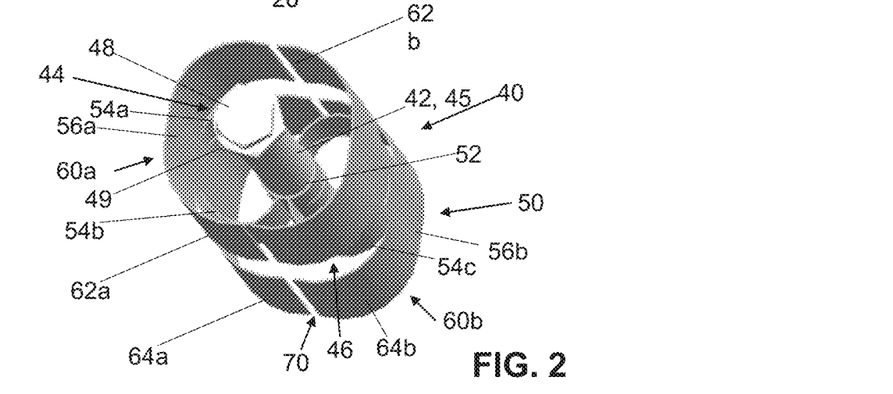
FIG. 2 is a perspective view of a basket strainer insert according to one or more embodiments of the present invention.

In an exemplary embodiment shown in FIG. 2, the body 42 includes cap 48 having a hexagonal outer surface. The body 42, which includes a drywell 51 (shown in FIG. 7), includes a first, open end 44, through which the one or more magnets 80 are inserted and removed, and a second, closed end 46. The removable cap 48 may be secured to the first end 44 of the body 42. Due to the presence of the magnets 80 in the drywell 51, the fine metal particles on the inside of the straining element 14 will collect on an outer surface of the body 42. The drywell 51 may be made from a nonmagnetic material and may be different from the material for the body 42 and baffle 50.

In order to remove the collected metal particles from the outer surface of the body 42, the body 42 may be removed from the basket strainer 10. Once removed from the basket strainer 10, the cap 48 may be removed from the body 42. With the cap 48 removed, the magnets 80 may be removed from the body 42. Since the magnets 80 are no longer in the body 42, the metal particles that have collected on the outer surface of the body 42 may fall off or be wiped off.

To increase the ability to attract metal particles, the insert 40 may include a baffle 50 disposed about an intermediate portion 45 of the body 42.

The baffle 50 may be mounted to the body 42 via a collar 52. In the depicted embodiment, four curved portions 54a-54d extend from the collar 52 and connect to substantially straight portions 56a, 56b from which lobes 60a, 60b extend (see FIG. 5). The lobes 60a, 60b each have upper portions 62a, 62b and lower portions 64a, 64b. The lobes 60a, 60b shown in the illustrated embodiment are a preferred design and that the baffle 50 can be any shape that achieves the function of slowing the fluid flow within the basket strainer 10 so the magnetic debris is able to be collected.

As stated above, the baffle 50 may be removably mounted to the body 42 using the collar 52. The baffle 50 may be secured removably or permanently to the body 42 by any number of conventional fasteners or securing methods, including, for example gluing, clamping, welding, brazing, or weld clip, to name a few.

The material of construction of the baffle 50 could be metal. In a preferred embodiment a corrosion-resistant material such as stainless steel is used. Other corrosion-resistant materials may be used depending on the application. Further, corrosion-resistant metals (such as aluminum or galvanized steel) may be used, or a corrosion-resistant polymer-based materials (such as polyolefins or fluoropolymers such as polytetrafluoroethylene) may be used.

Figure 3:
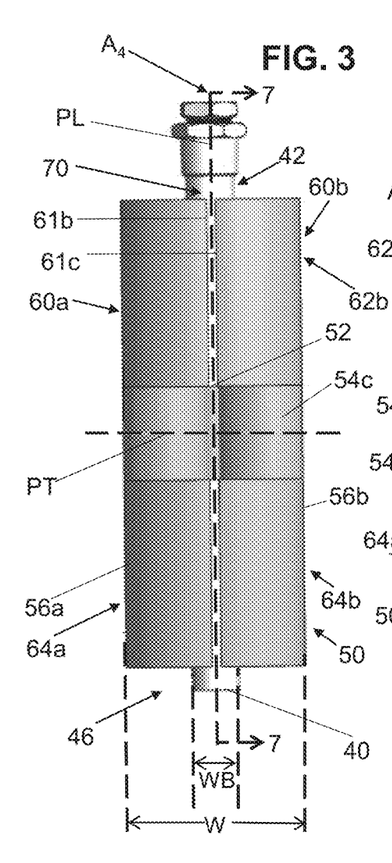
FIG. 3 is a side view of the basket strainer insert of FIG. 2.
Figure 4:
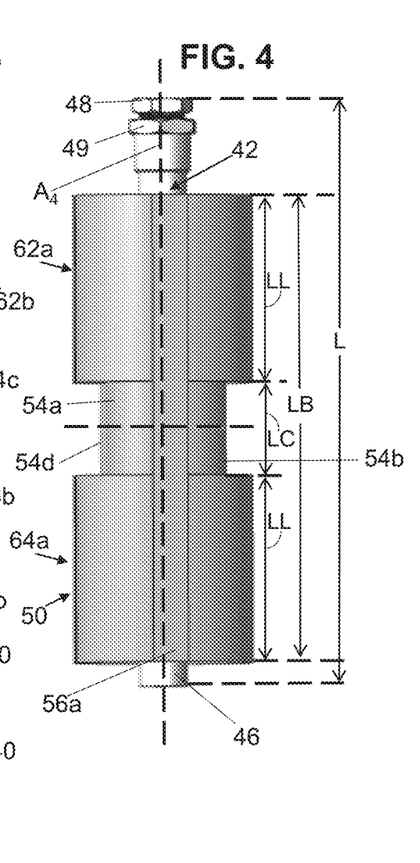
FIG. 4 is a further side view of the basket strainer insert of the embodiment shown in FIGS. 2 and 3.

FIG. 3 shows a side view of the baffle 50 and FIG. 4 shows a further side view of the baffle 50. A gap 70 between the lobes 60a, 60b is visible in FIG. 3. The collar 52 is joined to the curved portions 54a-54d. The curved portions 54a-54d are also joined to substantially straight portions 56a, 56b of the baffle 50. The substantially straight portions 56a, 56b each operate as a rigid spine from which the upper and lower portions of the lobes 60a, 60b extend.

The baffle 50 may have a generally tubular shape (see FIG. 3) that may be concentric with the body 42. The baffle has a width W that is greater than a width WB of the body 42. The width of the baffle can be slightly greater or significantly greater than the width of the body. In the illustrated embodiment, the width of the baffle is between about one and about four times greater than the width of the body, wherein a ratio of the baffle width W to the body width WB is between about 2:1 and about 5:1. The baffle 50 is symmetrical about a longitudinal plane PL and a middle transverse plane PT.

The baffle 50 may be mounted to an intermediate (middle) portion of the body 42. The collar 52 is visible in FIG. 3 between the curved portions. The gap 70 is disposed between adjacent edges 61a, 61d and 61b, 61c of the upper portions 62a, 62b and lower portions 64a, 64b of the lobes 60a, 60b (see FIG. 5).

FIG. 4 shows that the body 42 has a length L that is greater than the length LB of the baffle 50. However, in other embodiments, the length L of the body 42 and the length LB of the baffle could be equal or the length LB of the baffle could be greater than the length L of the body 42. The upper portions 62a 62b of the lobes 60a, 60b have lengths LL that are equal. The collar 52 and the curved portions 54a-54d have lengths LC that are centered relative to the transverse plane PT.

The overall width W and length L of the basket strainer insert 40 allows it to fit within the basket strainer 10. The basket strainer insert 40 may not be physically secured to either the interior of the housing 12 or the straining element 14. This allows for easy insertion and removal. As such, during the operation of the basket strainer 10, the basket strainer insert 40 may tilt toward the inlet or the outlet 22 such that the longitudinal axis $A_4$ of the body 42 is not coincident with the longitudinal axis $A_3$ of the straining element.

The upper portion 44 of the body 42 may be thicker than the elongate intermediate portion 45 and the lower portion 46 to provide strength to withstand opening and closing of the cap 48 to a hexagonal boss 49 with wrenches.

Figure 5:
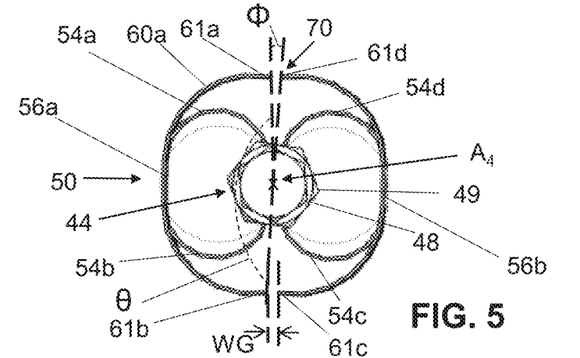
FIG. 5 is a top view of the basket strainer insert of the embodiment shown in FIGS. 2-4.
Figure 6:
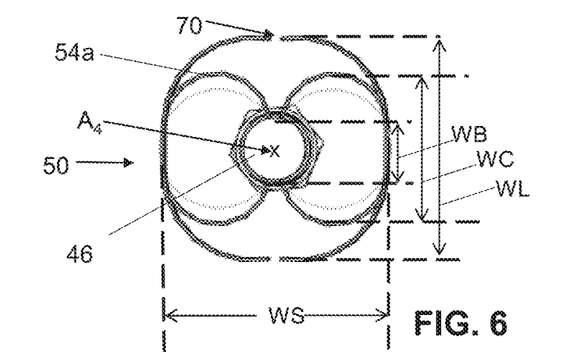
FIG. 6 is a bottom view of the basket strainer insert of the embodiment shown in FIGS. 2-5.

The baffle 50, as shown best in FIGS. 5 and 6, when viewed along the longitudinal axis $A_4$ of the body, has a substantially circular cross section. However, other shapes may be used, for example, oval, diamond, triangular, C-shape, U-shape, V-shape, octagonal, star-shaped. As an exemplary embodiment, it is contemplated that the baffle 40 has a rounded corners and substantially flat sides. Again, other shapes and arrangements may be used to control the flow of fluids.

FIG. 5 shows a top view of the baffle 50 along the longitudinal axis $A_4$ of the body, and FIG. 6 shows a bottom view of the baffle 50 along the longitudinal axis $A_4$ of the body. Each of the two lobes 60a, 60b of the baffle has a circumference that spans a lobe angle θ, which is between about 160 to about 178 degrees in relation to the longitudinal axis $A_4$ as shown in FIG. 5. The gaps 70 are positioned opposite one another in the illustrated embodiment. Each gap 70 has a width WG and a gap angle Φ defined, as shown in FIG. 5, between lobes 60a, 60b and measures about 2 and about 10 degrees in relation to the longitudinal axis $A_4$.

In a further embodiment, the curved portions 54a-54d that support the baffle 50 in the illustrated embodiment could also be straight. In the illustrated embodiment, such support pieces are located in the intermediate portion of the body, but in further contemplated embodiments, the supports could be mounted at various locations in a number of rows having straight or staggered arrangements with respect to the longitudinal axis of the body or a clustered gang-pattern.

In addition, the baffle in the illustrated embodiment has a substantially round cross section. In further contemplated embodiments, the baffle need not be round, and could be square, triangular, hexagonal, or any other geometric shape.

The substantially straight portions 56a, 56b define a diameter WS. The edges 61a-61d of the lobes 60a, 60b define a diameter WL that is equal to the diameter WS defined by the substantially straight portions 56a, 56b. The curved portions define a width WC. The diameter W of the baffle 50 is between about 2 and about 4 times larger than the diameter WB of the body 42.

FIG. 6 shows the bottom view of the baffle insert 40. From the bottom view, the diameter WB of the elongate intermediate portion 45 of the body 42 is shown. The width WC of the curved portions that join onto the same lobe is shown as W, and the width of the lobes is shown as WL. The width of the baffle 50 across the substantially straight portions 56a, 56b is shown as WS, which is substantially equal to W.

The lobes 60a, 60b have a curvature that follows a radius, which is larger than the radius that defines the curved portions 54a-54d. The edges of the two lobes are oriented close to each other such that a small gap 70 is formed between adjacent lobes. This creates regions of high and low flow inside the baffle allowing for ferrous particles to slow down and accumulate on the magnetic region of the body.

In the illustrated embodiment, two lobes are depicted, however it is contemplated that as few as one lobe could be used, or more than two lobes could be used to provide a baffle around a magnetic central cylinder.

Figure 7:
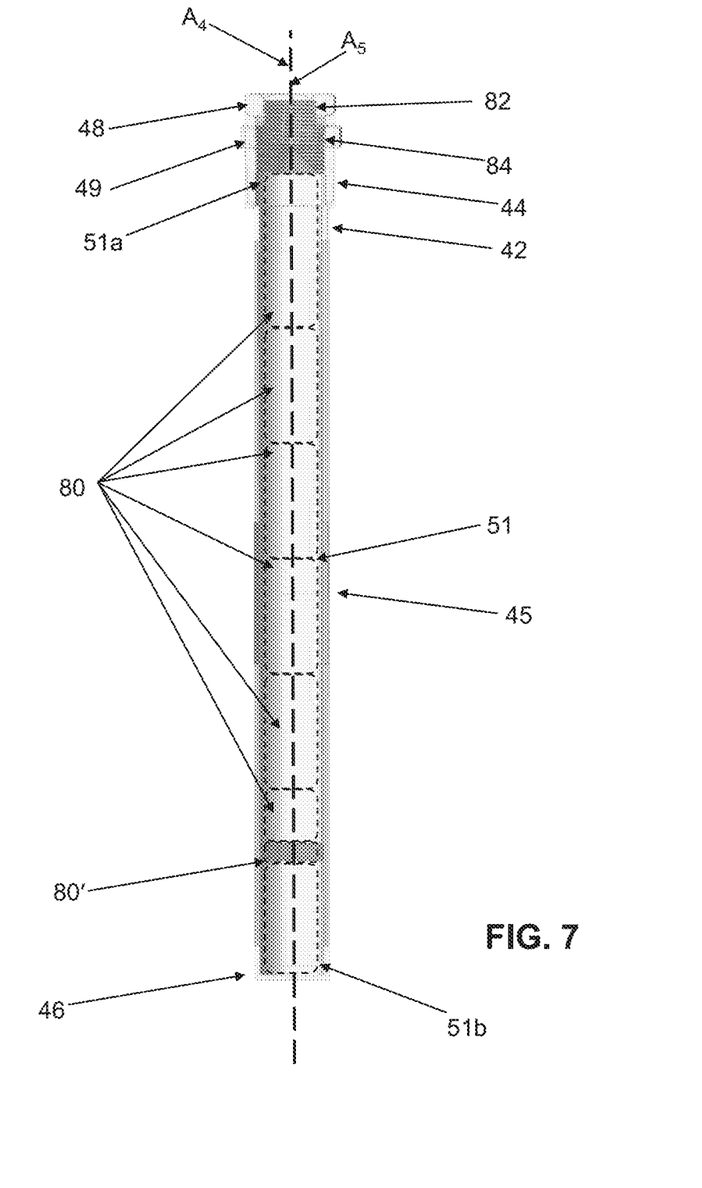
FIG. 7 is a cross section view of the body of the basket strainer insert of the embodiment shown in FIGS. 2-6.

FIG. 7 shows a cross-section of the body of the basket strainer insert taken along line 7-7 of FIG. 3, which is the longitudinal axis of the body $A_4$. The drywell 51 is depicted as containing a plurality of magnets 80. The drywell 51 comprises an open end 51a and a closed end 51b. In the illustrated embodiment, the longitudinal axis $A_4$ of the body 42 and a longitudinal axis $A_5$ of the drywell 51 are coincident.

The cap 48 is joined to the hexagonal boss 49 of the upper portion 44 of the body 42 using threaded surface 82 that engages a threaded bore 84 of the body 42. Six magnets 80 are shown in the illustrated embodiment and are cylindrical to conform to the drywell 51 and have varying lengths. Alternatively, the magnets could be of uniform size, or a single magnet could be utilized. In the illustrated embodiment, the drywell 51, and the magnets 80 contained therein, could be withdrawn from the body to allow the body 42 to be wiped clean of magnetic debris. In a further embodiment, a single magnet 80' is disposed in the drywell.

Figures 8A, 8B:
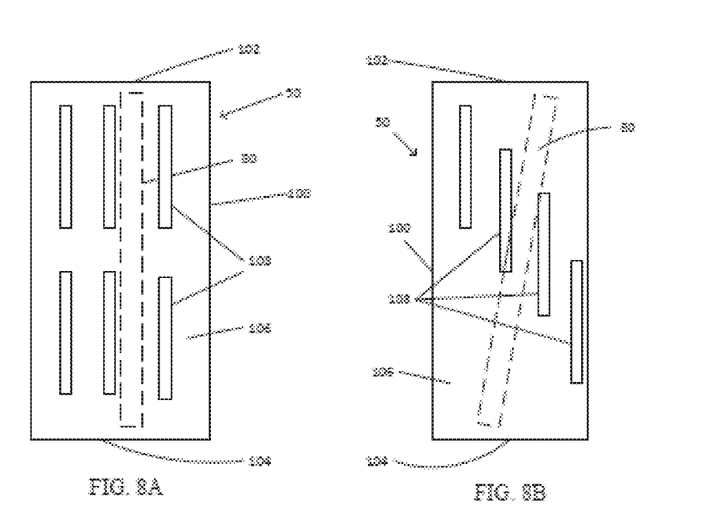
FIG. 8A is a side view of an alternative insert with a baffle and a magnet in accordance with one or more embodiments of the present invention.
FIG. 8B is a side view of yet another alternative insert with a baffle and a magnet in accordance with one or more embodiments of the present invention.
Figure 8C:
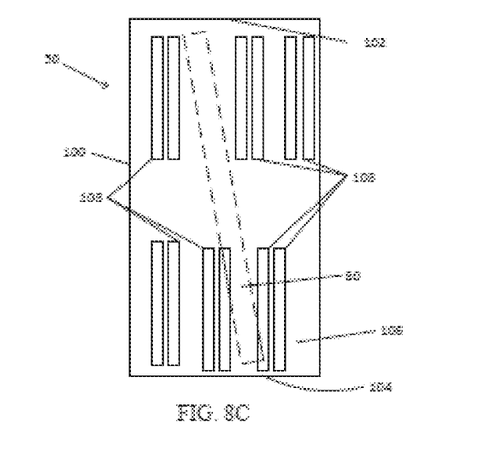
FIG. 8C is a side view of still another alternative insert with a baffle and a magnet in accordance with one or more embodiments of the present invention.

The baffle 50 depicted in FIGS. 2-6 is merely a preferred embodiment, and it is contemplated that the baffle 50 that surrounds the magnet(s) 80 may have any shape. For example, as shown in FIGS. 8A-8C, the baffle 50 may be a hollow body 100 with an open top 102 end and open bottom end 104. Disposed on an outer surface 106 are a plurality of apertures 108, or openings, allowing fluid to pass into the inner cavity in with the magnet(s) 80 is located. Again, the cross-section of the hollow body 100 along a longitudinal axis (i.e., when viewed from the top or bottom) need not be circular, but can be any shape for example, elliptical or even polygonal, including, triangular, rectangular, octagonal, to name a few. Additionally, the apertures 108 can be arranged in a straight-lined pattern (FIG. 8A), a staggered pattern (FIG. 8B), a gang pattern (FIG. 8C), or any other pattern. Finally, while the depicted apertures 108 are elongated rectangular openings, other shapes and sizes for the apertures 108 may also be used so long as they permit flow of fluid and the metal particles into the hollow body 100.

Additional embodiments of the present invention are shown in FIGS. 9A to 9D. In these depicted embodiments, the basket insert 200 has a cylindrical body 202 that contains magnets 204 inside of a drywell 206 within the body 202. The body 202 extends from a first end 201 to a second end 203 with an intermediate portion 205 therebetween. The second end 203 is a closed end. A hexagonal cap 208 selectively seals the drywell 206 at the first end 201 of the body 202. As with previous embodiments, in these embodiments, a baffle 210 is disposed around the body 202 and the magnets 204.

Figure 9A:
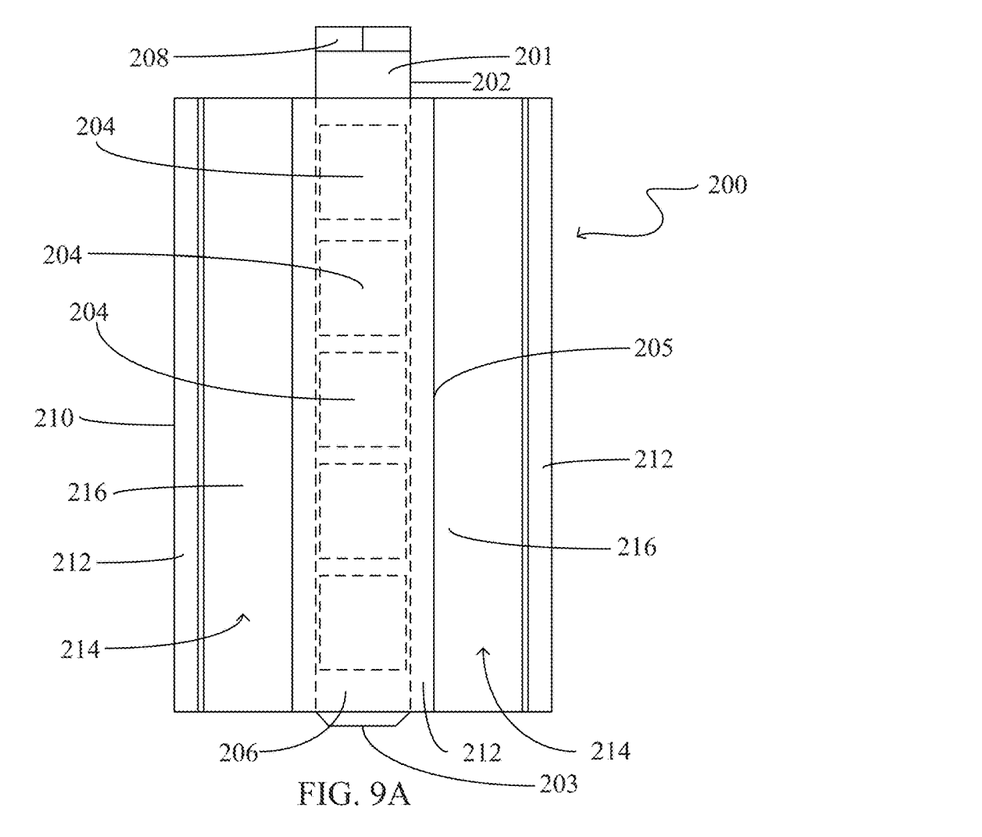
FIG. 9A is a side view of yet another alternative insert with a baffle and a magnet in accordance with one or more embodiments of the present invention.

In a preferred configuration, the baffle 210 has four lobes 212 that are equidistantly spaced around the body 202. Between adjacent lobes 212 are gaps 214 thus creating an alternation of gaps 214 and lobes 212 around the body 202. The gaps 214 extend along the entire length of the lobes 212, the length being measured in a direction along an axis extending from the first end 201 to the second end 203 of the body 202. The lobes 212 have a length that is nearly equal to the length of the body 202. The lobes 212 also have a width measured as the shortest distance along an outer surface of the lobes 212 between adjacent gaps 214. The number of lobes 212 and gaps 214 could be as low as three and as many as six, with four being the most preferred.

Figure 9B:
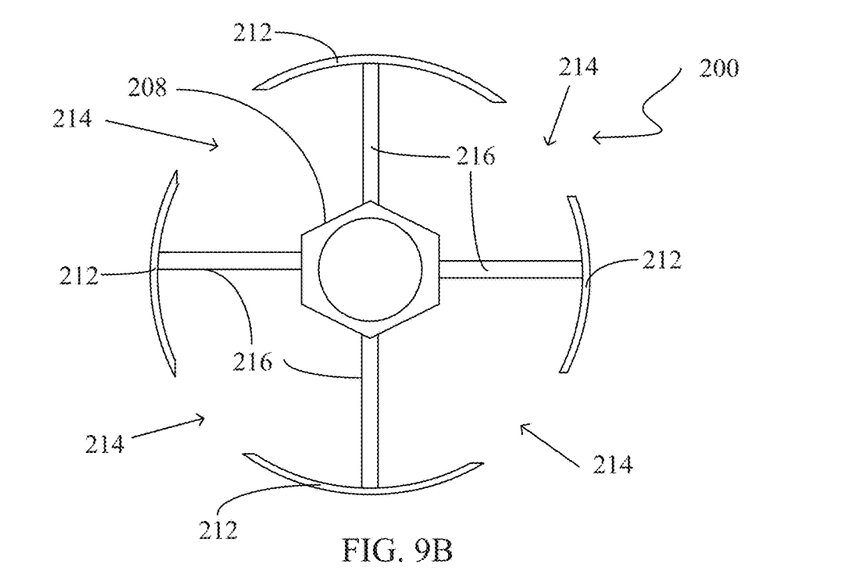
FIG. 9B is a top view of the insert shown in FIG. 9A.
Figure 9C:
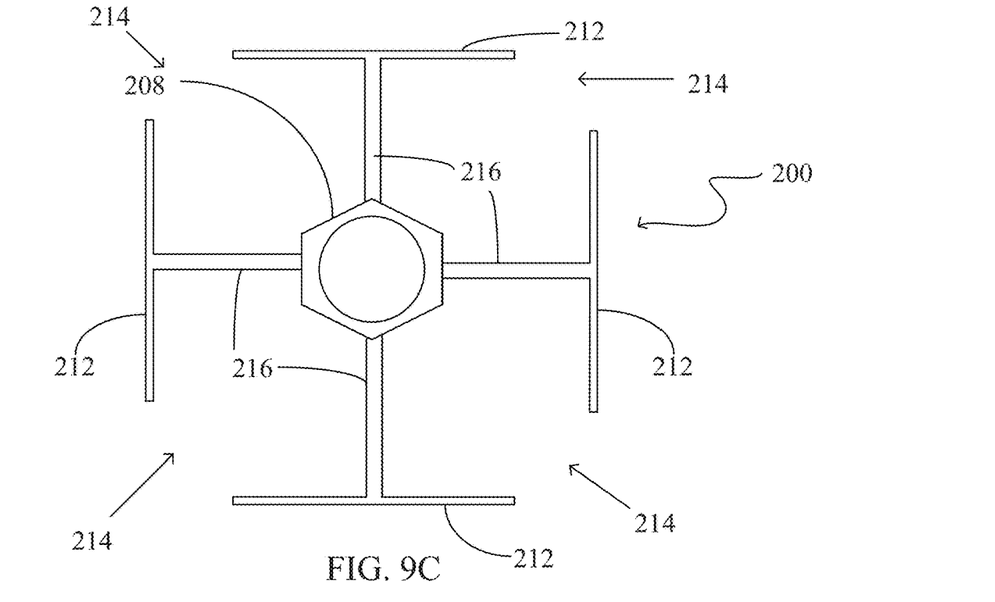
FIG. 9C is a top view of another insert with a baffle and a magnet similar to the one shown in FIGS. 9A and 9B; and, FIG. 9D is a top view of still another insert with a baffle and a magnet similar to the one shown in FIGS. 9A and 9B.
Figure 9D:
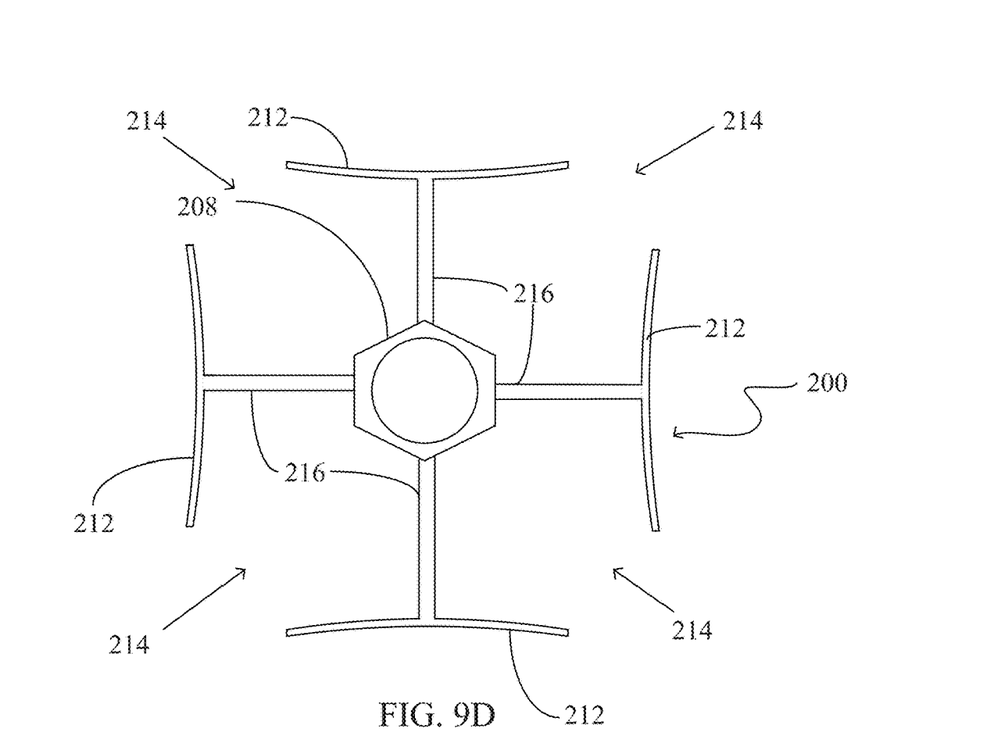

The lobes 212 are secured to the body 202 by coupling portions 216 extending relatively perpendicularly to the lobes 212. As shown in FIGS. 9B to 9D, when viewed along the axis of the body extending from the first end 201 to the second end 203, the coupling portion 216 form a T-shape with the lobes 212. The coupling portions 216 are preferably also disposed equidistantly from each other and most preferably 90 degrees from each other and radially extend outward from the body 202. In a preferred embodiment, the coupling portions 216 are integrally formed with the body 202. Additionally, it is preferred that the lobes 212 and the coupling portions 216 are integrally formed together. The coupling portions 216 are solid, i.e., they do not have any apertures or openings to allow fluids to flow therethrough.

In the embodiment of FIGS. 9A and 9B, the lobes 212 are convex, or have an inward curve (when viewed from the top). Accordingly, all of the lobes 212 may be on the circumference of a circle having a center on the longitudinal axis of the body 202. As shown in FIG. 9C, it is also contemplated that the lobes 212 are planar. In such a case, the lobes 212, may lie on the perimeter of a square having a center in the body 202. It is further contemplated, as shown in FIG. 9D, that the lobes 212 are concave or have an outward curve. Additionally, the insert 200 may have a combination of these different orientations for the lobes 212. Any of the foregoing shapes for the lobes 212 are believed to be suitable for the lobes 212 to cause eddies in the fluid and slow the movement of the magnetic particles in the fluid, allowing the particles to be captured in the magnetic field created by the magnets 204. However, it has been found that the lobes 212 having a convex shape (as shown in FIG. 9B), or inwardly bent lobes, provide the best disruption of the flow to fluid flowing through the basket strainer (see, FIG. 1) and attract metal particles to the magnets 204 in the body 202.

When desired or required, the entire insert 200 may be removed from the basket strainer (FIG. 1) and the magnets 204 may be removed. Once the magnets 204 are removed from the body 202, most, if not all of the metallic particles on the body 202 will fall off the body 202. However, some may remain, and the body 202 may be wiped off or cleaned to remove any remaining particles. After being cleaned, the magnets 204 may be re-inserted, the cap 208 closed, and the insert 200 returned to the basket strainer.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of my contribution to the art.

The invention claimed is:

1. A basket strainer insert for a basket strainer having an inlet and an outlet, the inlet and the outlet lying on an axis of the basket strainer, the basket strainer insert comprising:
   a body, the body comprising a first end, a second end, and an intermediate portion;
   at least one magnet disposed in the body and configured to remove metal particles from a fluid, wherein the body comprises a drywell in which the first end of the body is configured to selectively open to allow for removal of the at least one magnet from the body, and wherein the metal particles collect on an outer surface of the body; and
   a baffle secured to the body, the baffle comprising between three to six lobes, with adjacent lobes separated by gaps, each lobe secured to the body by a connecting portion and configured to reduce a flow rate of the fluid,
   wherein a longitudinal axis of the body of the basket strainer insert is configured to intersect the axis of the basket strainer.

2. The basket strainer insert of claim 1, wherein the connecting portions are integrally formed with the lobes.

3. The basket strainer insert of claim 2, wherein the connecting portions are integrally formed with the body.

4. The basket strainer insert of claim 1, wherein the lobes have an inward bend.

5. The basket strainer insert of claim 1, wherein the lobes have an outward bend.

6. The basket strainer insert of claim 1, wherein the lobes are planar.

7. The basket strainer insert of claim 1, wherein the connecting portions extend between the body and the lobes and form a T-shape.

8. The basket strainer insert of claim 1, wherein all of the lobes are each connected to the body by a connecting portion extending perpendicular to a lobe connected thereto, and wherein all of the lobes lie on a circumference of a circle having a center on the longitudinal axis of the body or on a perimeter of a square having a center on the longitudinal axis of the body.

9. The basket strainer insert of claim 1, wherein the lobes are equidistantly spaced from each other.

10. A basket strainer insert for a basket strainer having an inlet, an outlet, and a straining element having a longitudinal axis contained within the basket strainer, the basket strainer insert comprising:
   a body, the body comprising a first end, a second end, and an intermediate portion;
   at least one magnet disposed in the body and configured to remove metal particles from a fluid, wherein the body comprises a drywell in which the first end of the body is configured to selectively open to allow for removal of the at least one magnet from the body, and wherein the metal particles collect on an outer surface of the body; and
   a baffle secured to the body, the baffle comprising four lobes, with adjacent lobes separated by gaps, each of the four lobes secured to the body by a connecting portion integrally formed with the lobe,
   wherein each lobe is configured to reduce a flow rate of the fluid,
   wherein a longitudinal axis of the body intersects the longitudinal axis of the straining element.

11. The basket strainer insert of claim 10, wherein the four lobes have an inward bend.

12. The basket strainer insert of claim 10, wherein the four lobes have an outward bend.

13. The basket strainer insert of claim 10, wherein the four lobes are planar.

14. The basket strainer insert of claim 10, wherein the connecting portions extend between the body and the four lobes and form a T-shape.

15. The basket strainer insert of claim 10, wherein the four lobes are equidistantly spaced from each other.

16. The basket strainer insert of claim 10, wherein the four lobes are each connected to the body by a connecting portion extending perpendicular to a lobe connected thereto, and wherein the four lobes lie on a circumference of a circle having a center on the longitudinal axis of the body or on a perimeter of a square having a center on the longitudinal axis of the body.

17. A basket strainer comprising:
   an axis extending between an inlet and an outlet;
   a straining element having a longitudinal axis contained within the basket strainer; and,
   insert having a longitudinal axis and comprising:
      a body, the body comprising a first end, a second end, and an intermediate portion;
      at least one magnet disposed in the body and configured to remove metal particles from a fluid, wherein the body comprises a drywell in which the first end of the body is configured to selectively open to allow for removal of the at least one magnet from the body, and wherein the metal particles collect on an outer surface of the body; and
      a baffle secured to the body, the baffle comprising four lobes, with adjacent lobes separated by gaps, each of the four lobes secured to the body by a connecting portion integrally formed with the lobe, the connecting portions integrally formed with the body,
   wherein the four lobes each have an inward bend,
   wherein each lobe is configured to reduce a flow rate of the fluid,
   wherein the longitudinal axis of the insert intersects the axis of the basket strainer, and
   wherein the longitudinal axis of the insert intersects the longitudinal axis of the straining element.

18. The basket strainer of claim 17, wherein the connecting portions extend between the body and the four lobes and form a T-shape.

19. The basket strainer of claim 17, wherein the four lobes are equidistantly spaced from each other.

20. The basket strainer of claim 17, wherein the four lobes are each connected to the body by a connecting portion extending perpendicular to a lobe connected thereto, and wherein the four lobes lie on a circumference of a circle having a center on the longitudinal axis of the insert or on a perimeter of a square having a center on the longitudinal axis of the insert.

* * * * *